(12) United States Patent
Redford et al.

(10) Patent No.: US 8,376,816 B2
(45) Date of Patent: Feb. 19, 2013

(54) FISH FILLET BOARD

(76) Inventors: Kevin Michael Redford, Cherryvale, KS (US); John Philip Stone, Overland Park, KS (US)

( * ) Notice: Subject to any disclaimer, the term of this patent is extended or adjusted under 35 U.S.C. 154(b) by 0 days.

(21) Appl. No.: 13/354,049

(22) Filed: Jan. 19, 2012

(65) Prior Publication Data
US 2012/0190286 A1 Jul. 26, 2012

Related U.S. Application Data

(60) Provisional application No. 61/461,961, filed on Jan. 26, 2011.

(51) Int. Cl.
A22C 25/08 (2006.01)
(52) U.S. Cl. ........................................................ 452/195
(58) Field of Classification Search .......... 452/194–197, 452/185, 102–105
See application file for complete search history.

(56) References Cited

U.S. PATENT DOCUMENTS

| | | | |
|---|---|---|---|
| 1,259,109 A | 3/1918 | Kugler et al. | |
| 2,531,546 A | 7/1947 | Anderson | |
| 2,725,592 A | 12/1955 | Pieper | |
| 2,756,457 A | 7/1956 | Banowetz | |
| 2,795,814 A | 11/1957 | Gaultney | |
| 2,945,256 A | 7/1960 | Harper | |
| 3,015,841 A | 1/1962 | Reutz | |
| 3,016,565 A | 1/1962 | Hill | |
| 3,177,523 A * | 4/1965 | Andersen | 452/195 |
| 3,237,240 A | 3/1966 | Bednar | |
| 3,248,751 A | 5/1966 | Wilborn | |
| 3,434,231 A * | 3/1969 | King | 43/53.5 |
| 3,445,885 A * | 5/1969 | Reitz | 452/195 |
| 3,713,188 A * | 1/1973 | Holladay | 452/196 |
| 3,727,269 A | 4/1973 | Snead | |
| 3,740,794 A | 6/1973 | Smith | |
| 3,757,386 A | 9/1973 | Murray | |
| 3,785,008 A | 1/1974 | Parker | |
| 3,790,988 A * | 2/1974 | Maxwell | 452/194 |
| 3,878,586 A * | 4/1975 | Hoppert et al. | 452/195 |
| 3,908,231 A * | 9/1975 | Price et al. | 452/195 |
| 4,663,806 A | 5/1987 | Mangum | |
| 4,794,670 A * | 1/1989 | Savastano, Jr. | 452/149 |
| 4,977,643 A | 12/1990 | Prysock | |
| 5,116,279 A * | 5/1992 | Perry | 452/195 |
| 5,376,043 A * | 12/1994 | Carter | 452/195 |
| 5,542,359 A * | 8/1996 | Polries | 108/26 |
| 6,942,562 B2 | 9/2005 | Kallask | |
| 7,390,249 B2 * | 6/2008 | Sorey | 452/195 |
| 7,674,163 B2 * | 3/2010 | Howard | 452/195 |

OTHER PUBLICATIONS

Select pages (3) from The Fish Gripper website http://www.fishgripper.com.

* cited by examiner

*Primary Examiner* — Richard Price, Jr.
(74) *Attorney, Agent, or Firm* — Hovey Williams LLP

(57) ABSTRACT

A fish fillet board has a clamp whose jaws have a horizontal line of action extending substantially parallel to the work surface of the base of the board. Thus, when the jaws hold the fish on its side against the base, they grip the fish by its lower lip to partially paralyze the fish and render it immobile. The clamp may be designed to be quickly and easily attached to and removed from the base, as well as inverted, so that the fish may be flipped over during filleting without releasing the clamp from the lower lip of the fish.

15 Claims, 12 Drawing Sheets

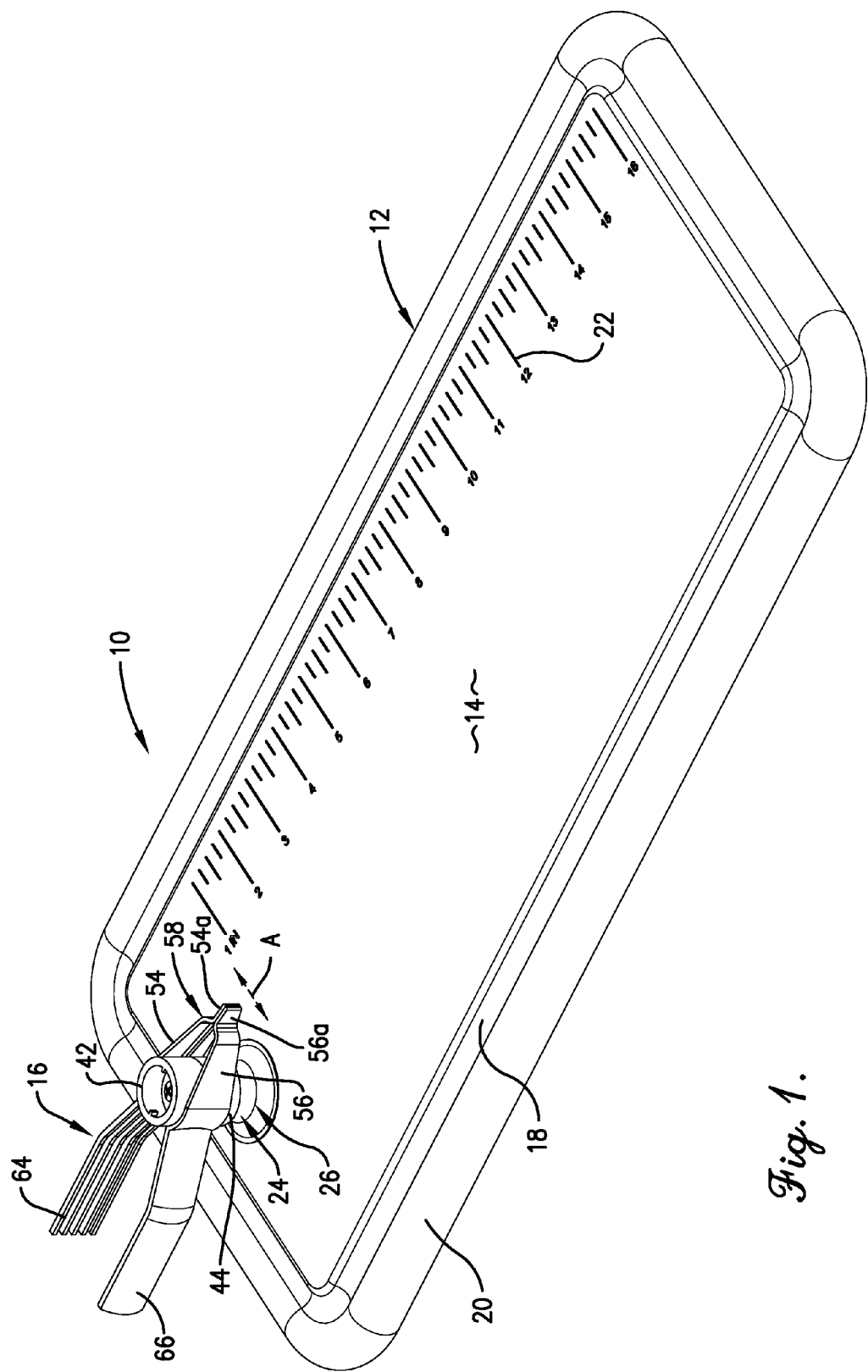

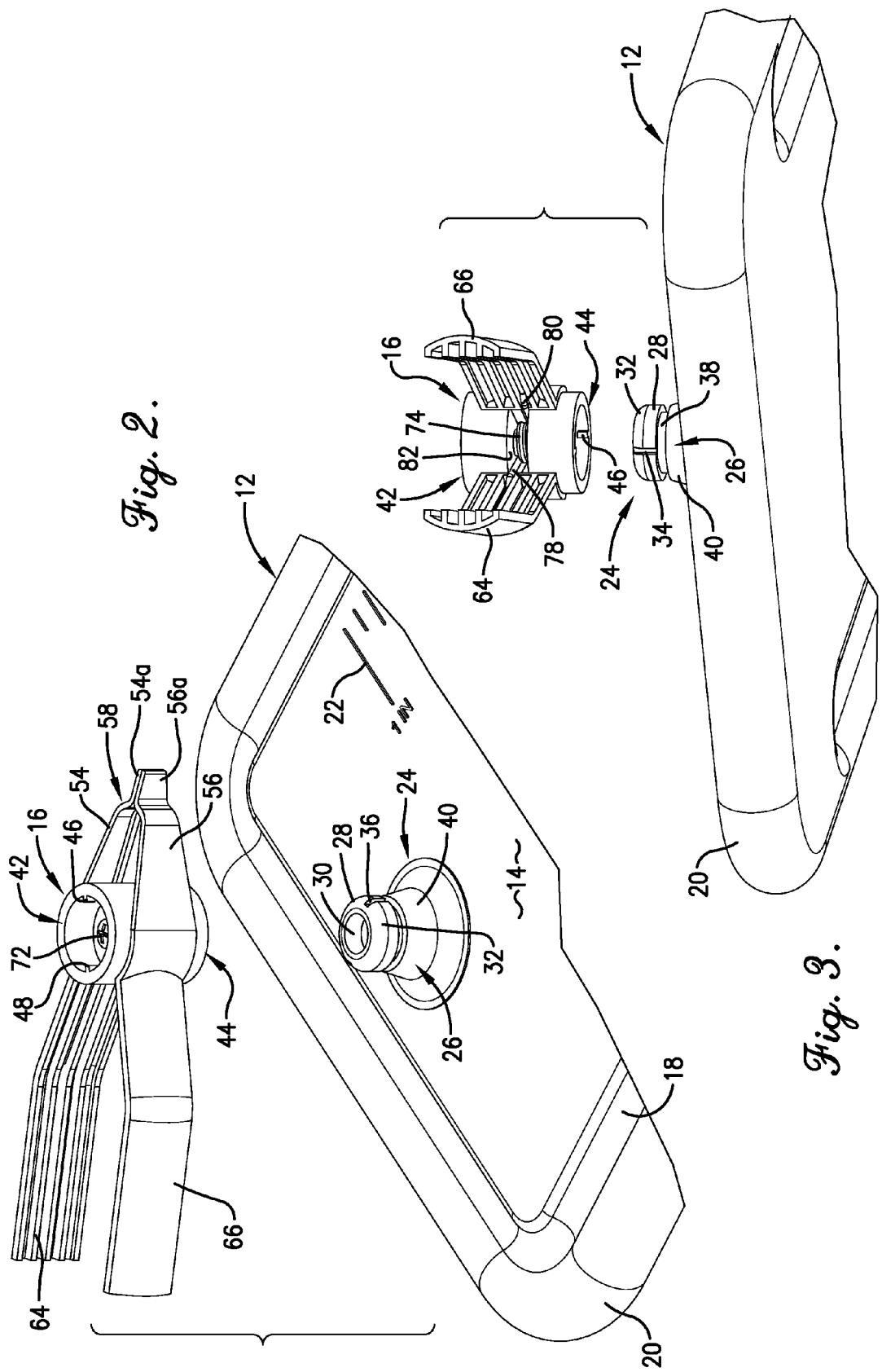

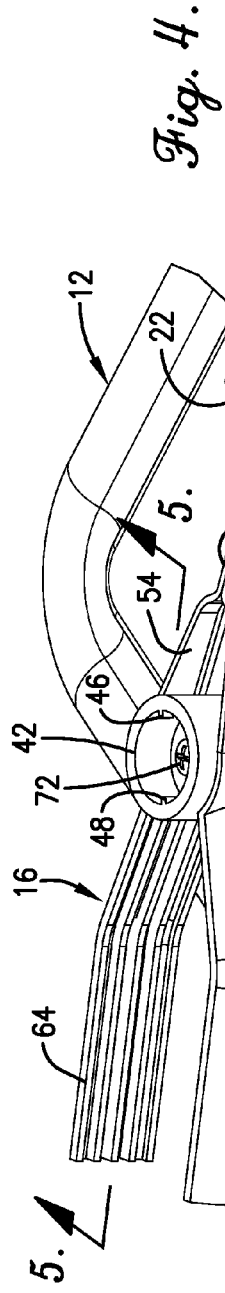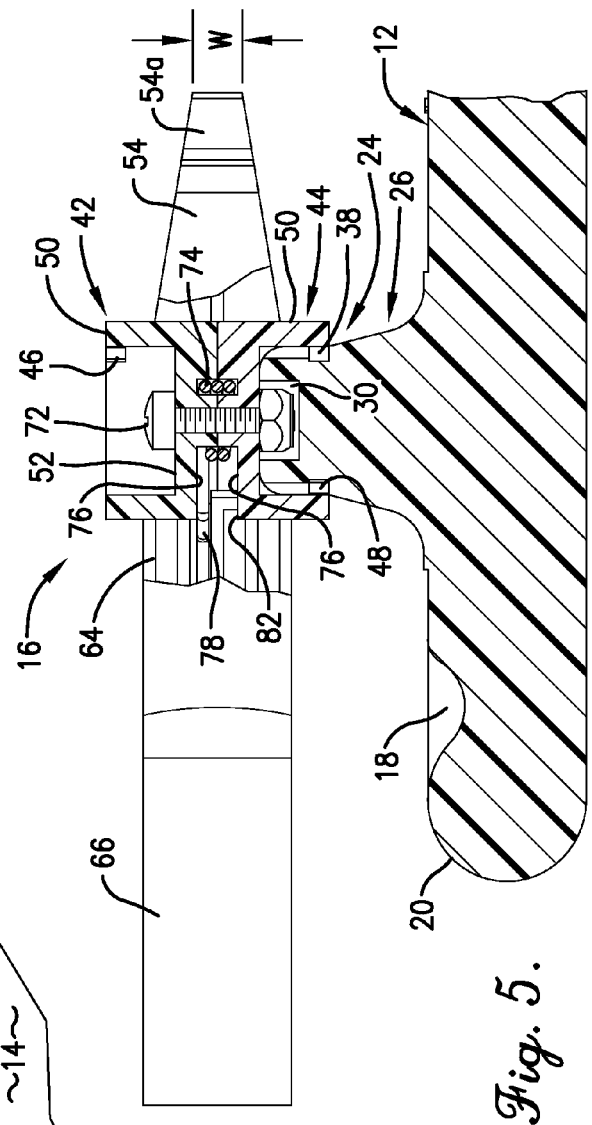

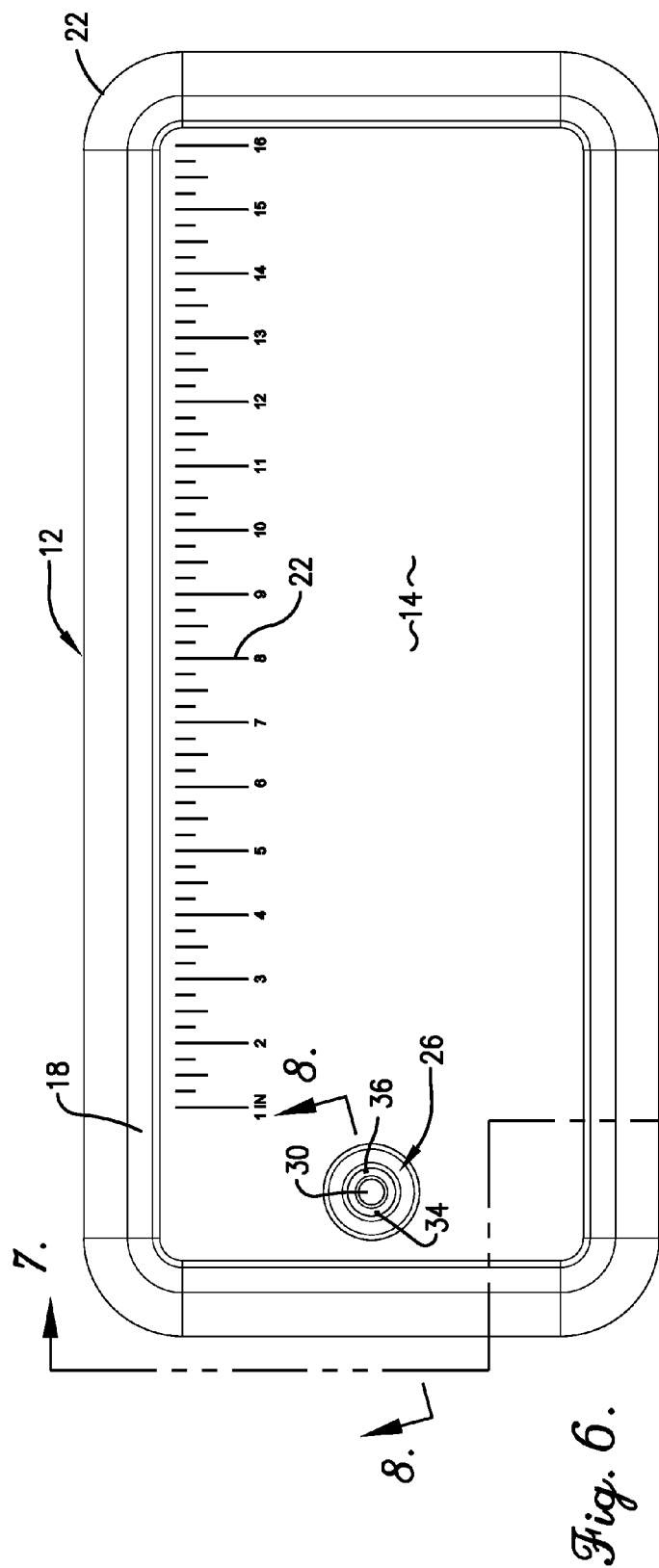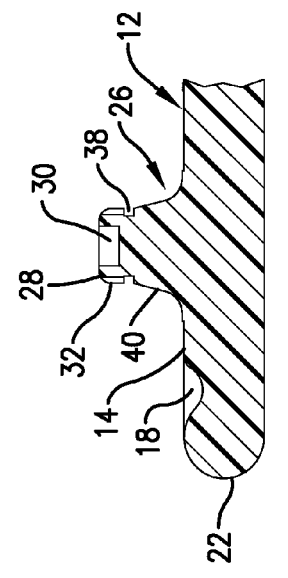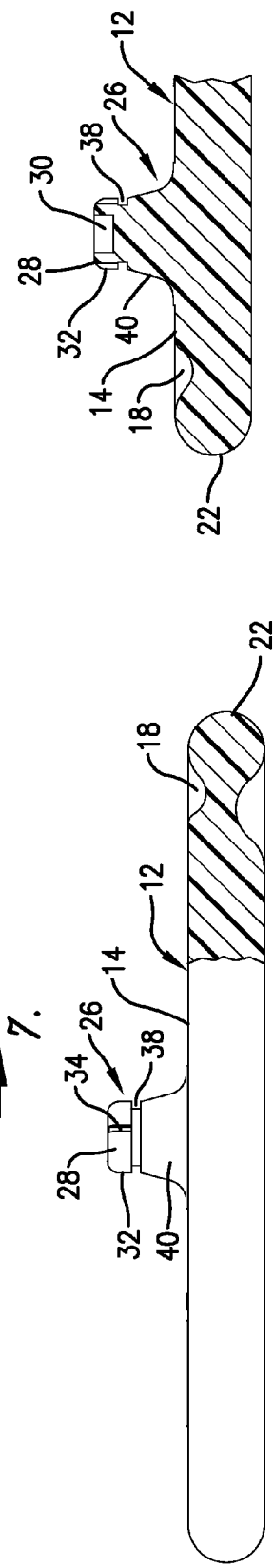

US 8,376,816 B2

FISH FILLET BOARD

RELATED APPLICATION

This application is related to and claims the priority benefit of prior U.S. Provisional Application No. 61/461,961 filed Jan. 26, 2011, said Provisional Application in its entirety being hereby incorporated by reference into the present specification.

TECHNICAL FIELD

The present invention relates to fish cleaning equipment and, more particularly, to an improved fish fillet board having a unique clamp that is designed to securely hold the fish by its lower lip and on its side while being filleted.

BACKGROUND AND SUMMARY

One popular way of cleaning fish is to cut fillets from opposite sides of the fish while leaving the fish's backbone, head, and viscera intact for disposal. Typically, the fish is held flatly against a suitable base or board either by a clamp mounted on the board, or by the fisherman himself as he holds the fish with one hand and manipulates his electric or fixed blade knife with the other. Ideally, when the fisherman holds the fish manually, he inserts his thumb into the fish's mouth and grips its lower lip between his thumb and forefinger, thereby partially paralyzing the fish to facilitate filleting. However, depending upon which side of the fish is being filleted, it may be awkward and uncomfortable for the fisherman to turn his wrist in the appropriate direction to maintain a strong grip on the fish's lip throughout the process. Moreover, in order to turn the fish over to fillet the opposite side, the fisherman must release his grip on the fish's lower lip, which also terminates the partial paralyzing effect. With the lip released, the fish can have a reflex action in which its tail flips in the air, flinging slime and viscera on anything within range.

Additionally, it may be difficult for the fisherman to hold onto the fish using only his thumb and forefinger, particularly considering the slippery, wet conditions present during the cleaning process and the significant force the fisherman must exert to resist the knife as it moves in a cutting stroke along the backbone and through the ribs of the fish. Furthermore, some fish species have ridges or razor-sharp teeth on the edges of their mouth, making the thumb-gripping technique dangerous if not impossible for the fisherman. Even where the fish has only small, rough teeth, the fisherman's thumb can become rough and sore after cleaning only a few fish.

The present invention provides a fillet board having a special clamp that holds the fish on its side against the base of the board while gripping the lower lip of the fish in an action closely simulating a manual thumb/forefinger-gripping technique, so that all the benefits of manual thumb/forefinger gripping action can be achieved without the attendant downside risks and drawbacks. By employing a mechanical device that simulates a fisherman's manual thumb/forefinger grip, the fisherman's hand that would otherwise be used to grip the fish is freed up to perform other duties or otherwise assist in the process. In a manner of speaking, the special clamp thus serves as a third hand.

In another aspect, the present invention also provides a fillet board wherein the thumb/forefinger-simulating clamp thereof may be quickly and easily turned over or inverted with the fish still attached after filleting the first side of the fish, so that the second side of the fish may be filleted without ever releasing the clamp's grip on the lower lip of the fish. Thus, the fish remains partially paralyzed and under control throughout the entirety of the filleting process. Alternative quick attach embodiments of the clamp are provided for carrying out this aspect of the invention.

These and other important aspects of the present invention will be apparent from the drawings and the detailed description which follows.

BRIEF DESCRIPTION OF THE DRAWINGS

FIG. 1 is a top perspective view of one embodiment of a fillet board constructed in accordance with the principles of the present invention and showing the detachable clamp locked in its ready-to-use position on the base;

FIG. 2 is a fragmentary top perspective view of the head end of the board with the clamp detached from the base but disposed at an oblique angle necessary to install the clamp onto or remove it from the base;

FIG. 3 is a fragmentary bottom perspective view of the head end of the board with the clamp detached from the base and in the install/remove obliquely angled position of FIG. 2;

FIG. 4 is a fragmentary top perspective view of the head end of the board with the clamp slipped down onto the mounting post just prior to being twisted into its locked and ready-to-use position of FIG. 1;

FIG. 5 is a fragmentary cross-sectional view of the head end of the base taken substantially along line 5-5 of FIG. 4;

FIG. 6 is a top plan view of the base with the clamp completely removed to reveal details of construction of the mounting post for the clamp;

FIG. 7 is a fragmentary cross-sectional view of the base taken substantially along line 7-7 of FIG. 6 to reveal details of construction;

FIG. 8 is a fragmentary cross-sectional view of the base taken substantially along line 8-8 of FIG. 6 to reveal details of construction;

DETAILED DESCRIPTION

Figure 9:
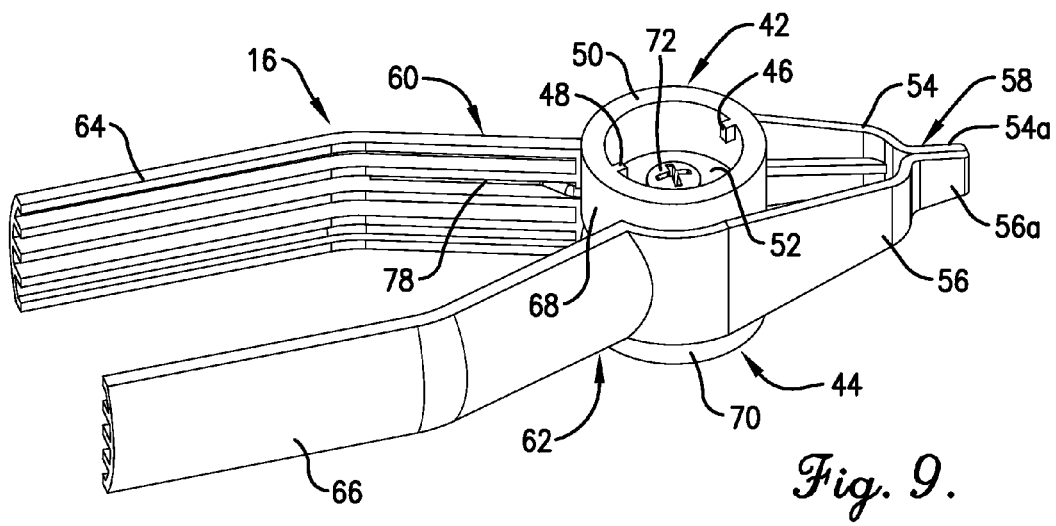
FIG. 9 is a top rear perspective view of the clamp with its jaws closed.
Figure 10:
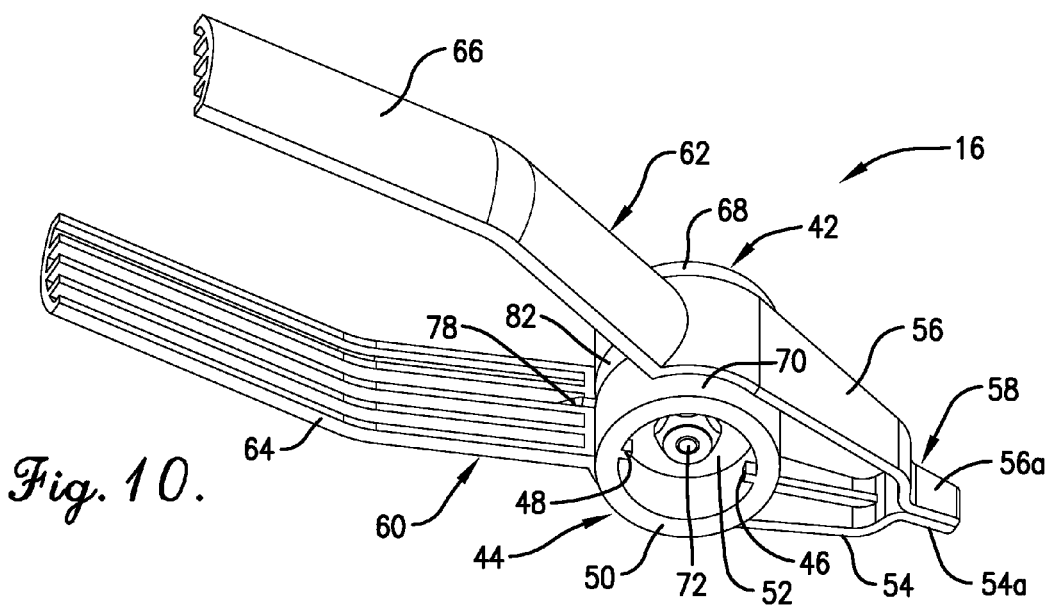
FIG. 10 is a bottom rear perspective view of the clamp with its jaws closed.
Figure 11:
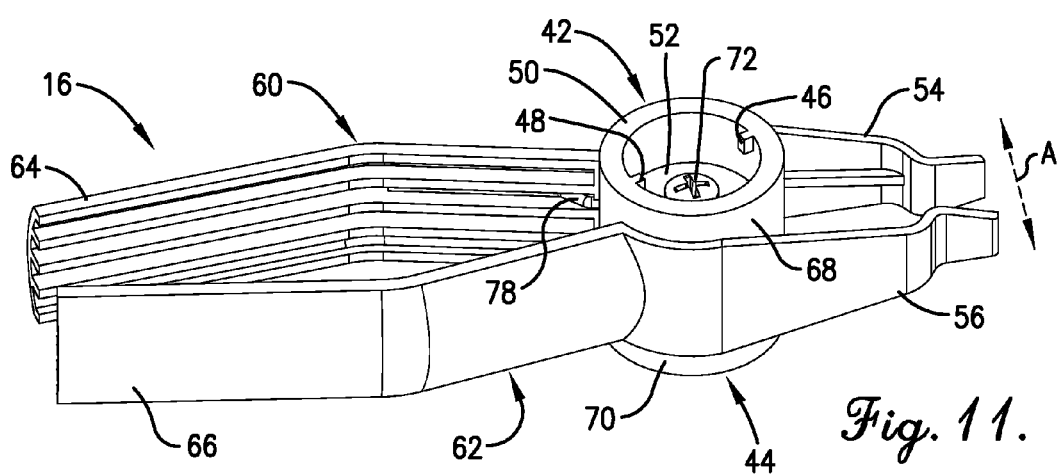
FIG. 11 is a top rear perspective view of the clamp similar to FIG. 9 but with its jaws open.
Figure 12:
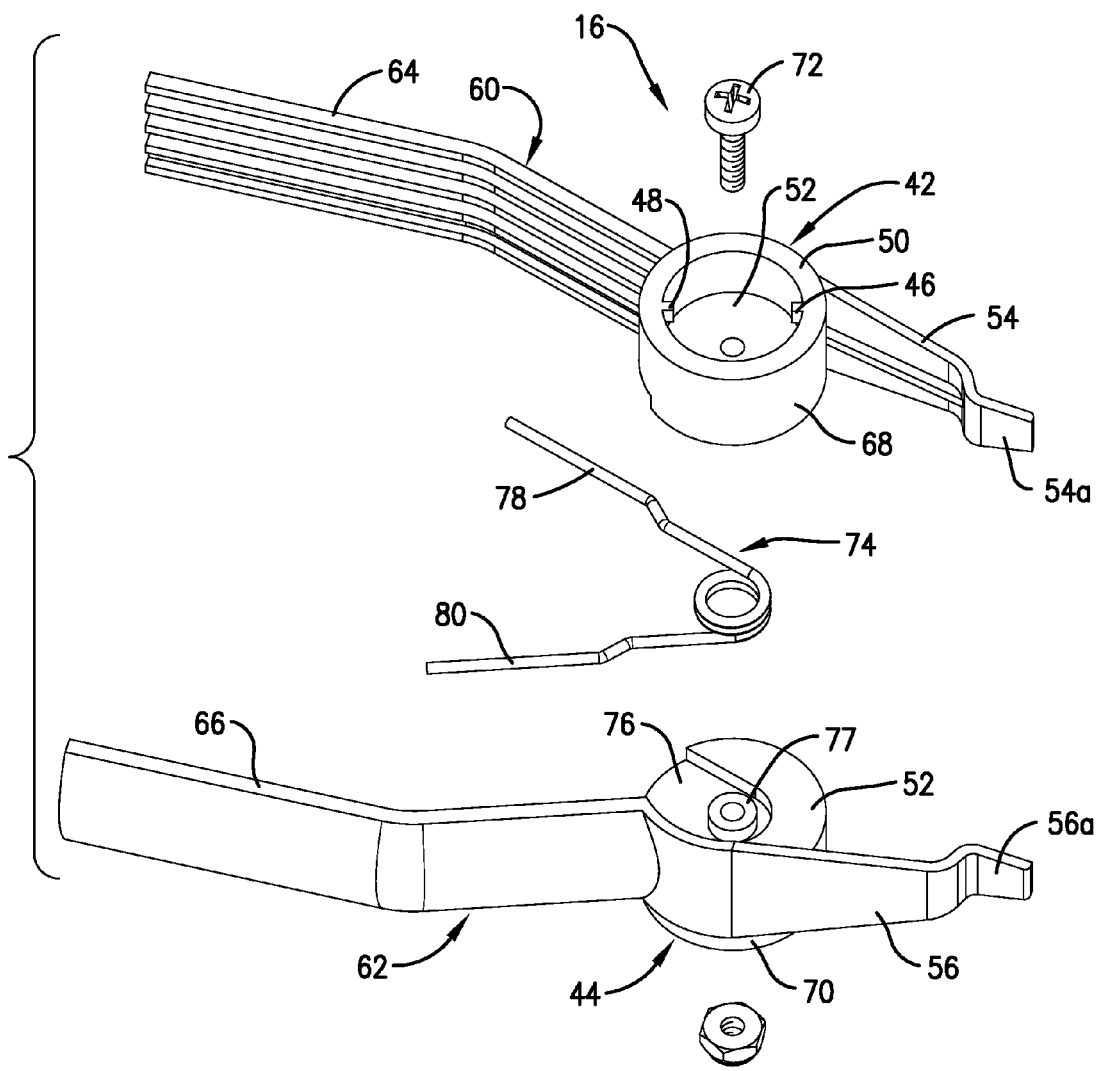
FIG. 12 is an exploded top perspective view of the clamp.
Figure 13:
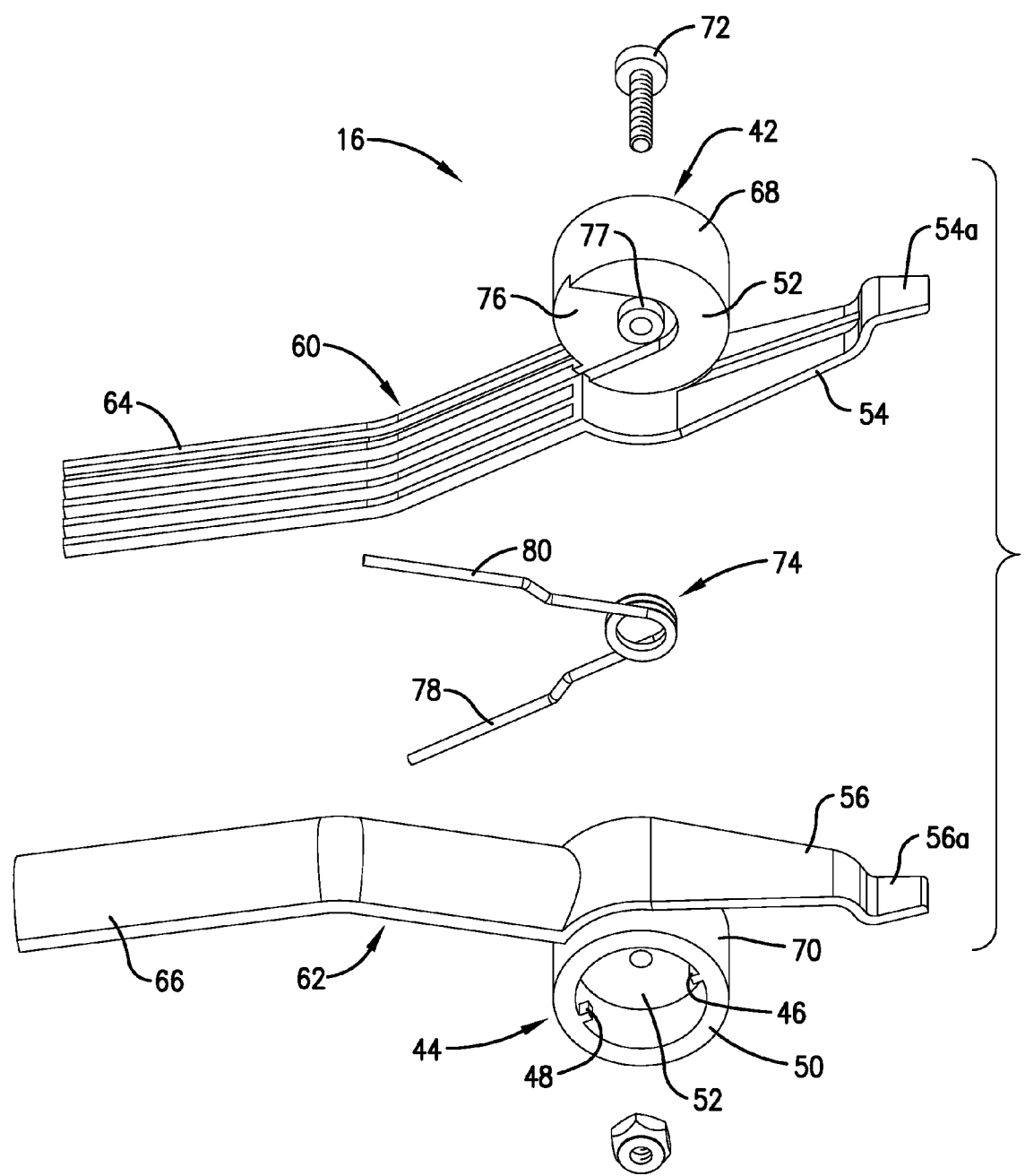
FIG. 13 is an exploded bottom perspective view of the clamp.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

As illustrated in FIGS. 1-13, the fillet board 10 includes two primary components, i.e., a generally flat, rectangular base 12 having an upwardly facing, generally flat work surface 14, and a clamp 16 for holding a fish on base 12 against work surface 14. As will be seen from the following description, clamp 16 is configured and arranged to grip the fish by its lower lip during use and to hold the fish flatly against base 12 such that the side of the fish bears against work surface 14.

Base 12 may be constructed from a variety of different materials using a variety of different manufacturing techniques. In one preferred embodiment, base 12 is constructed from a synthetic resinous material using an injection molding process to facilitate mass production, but other materials and techniques may be utilized without departing from the principles of the present invention. In the illustrated embodiment, base 12 is solid, but it could also be manufactured in such a way that it is hollow to reduce weight and material costs. In the embodiment illustrated in FIG. 1, base 12 has a recessed drain channel 18 entirely around work surface 14 and a rounded peripheral border 20 around drain channel 18 to avoid the presence of uncomfortable sharp corners and edges. Suitable indicia 22 for measuring the length of the fish being filleted may be provided along one margin of base 12 if desired. A number of supporting and stabilizing feet (not shown) may be provided on the backside of base 12 if desired.

Clamp 16 may be permanently or detachably mounted on base 12 in accordance with the principles of the present invention. In one preferred embodiment, clamp 16 is detachably mounted on base 12 adjacent the head end thereof by quick attach mounting structure broadly denoted by the numeral 24 and including cooperating components on both clamp 16 and base 12.

The mounting component of structure 24 that is on base 12 comprises a relatively short, upwardly projecting post 26 that is integrally formed with base 12 and is generally in the shape of a truncated cone. A generally circular head 28 on post 26 has a shallow, upwardly opening, cylindrical recess 30 and a circumferential rim 32 that surrounds recess 30. A pair of normally vertically extending, diametrically opposed notches 34 and 36 are provided in rim 32 at eleven o'clock and five o'clock positions respectively as base 12 is viewed in top plan with post 26 at the top of the view. Post 26 has a normally horizontally extending annular channel 38 immediately below head 28 that communicates with notches 34, 36 and is of reduced diameter relative to head 28. The lower pedestal portion 40 of post 26 below channel 38 flares out gently and merges with work surface 14 as the lower end of pedestal portion 40 is approached.

The component of quick attach structure 24 that is located on clamp 16 comprises at least one mounting socket that is sized and shaped to complementarily receive post head 28 when clamp 16 is placed on post 26. In one preferred embodiment, a pair of oppositely facing sockets 42 and 44 are provided on opposite upper and lower sides of clamp 16 so that clamp 16 is not only removably mounted on post 26, but is also reversibly mountable on the post with either selected side of clamp 16 facing upwardly.

Each socket 42, 44 (shown in detail in FIGS. 9-13) has a pair of diametrically opposed, normally vertically extending, radially inwardly projecting, interior locking lugs 46 and 48 in the sidewall 50 of the socket. Locking lugs 46, 48 are disposed at eleven o'clock and five o'clock positions respectively to match the positions of notches 34, 36 on post 26 and are sized and shaped to slip vertically through notches 34, 36 during installation and removal of clamp 16 from post 26.

Each of the lugs 46, 48 is slightly shorter in the vertical, axial direction than channel 38 is wide (vertically). Moreover, each socket 42, 44 is of such depth that when clamp 16 is slipped vertically onto post 26, lugs 46, 48 pass through notches 34, 36 and become aligned with and received within channel 38. Rotation of clamp 16 in either direction to misalign lugs 46, 48 with respect to notches 34, 36 places lugs 46, 48 under rim 32 and prevents clamp 16 from being lifted off post 26, i.e., clamp 16 is locked in place. Thus, once clamp 16 is properly installed on post 26, it can only be removed if and when clamp 16 is rotated to a position in which lugs 46, 48 are aligned with notches 34, 36. A floor 52 in each socket 42, 44 respectively pivotally rests upon head 28 of post 26 when clamp 16 is installed on post 26, depending upon which side of clamp 16 is facing downwardly.

Clamp 16 is designed to have its "line of action" A (FIGS. 1 and 11) disposed in a normally horizontal plane parallel to the plane of work surface 14 when the clamp is installed on base 12. It is also designed to reach into the mouth of the fish being filleted and to clamp down onto the lower lip of the fish so that the fish is partially paralyzed and laid flatly against work surface 14 during filleting. While clamp 16 could be provided with one movable and one stationary clamping jaw without departing from the principles of the present invention, in the embodiments illustrated in the drawings both jaws of the clamp are movable.

Thus, as illustrated in the drawings, clamp 16 preferably has a pair of opposed, relatively slender but sturdy clamping jaws 54 and 56 that are provided with mutually interengageable tips 54a, 56a. Although tips 54a, 56a are flat in the illustrated embodiment, they could also take a variety of other shapes and be provided with serrated teeth or the like without departing from the principles of the present invention. As illustrated in FIGS. 14-19, jaws 54, 56 are shaped and sized to facilitate insertion of one of the jaws 54, 56 into the fish's mouth against the inside of the lower lip, while the other jaw remains outside of the mouth bearing against the exterior of the fish's lower lip. Generally speaking, the configuration of jaws 54, 56 is such that they present a tapering nose 58 for clamp 16 when the jaws are closed, somewhat similar to the tapering nose of a pair of needle nose pliers. Each jaw 54, 56 has a transverse width dimension "W" (FIG. 5) in a direction (usually vertical) perpendicular to the line of action of the jaws that is small enough to permit the jaw to easily enter the fish's mouth and remain in that location throughout the filleting process. Depending upon the size of the fish to be filleted, dimension W may range, for example, from about 0.25 inches to 2.0 inches, most preferably from about 0.50 inches to 1.0 inches.

As shown in detail in FIGS. 9-13, the jaws 54, 56 comprise forward portions of corresponding longer limbs 60 and 62 respectively, the rear portions of which comprise a pair of sturdy squeeze handles 64 and 66. Near its midpoint, each limb 60, 62 also includes an integral cylinder 68 or 70 forming the wall 50 of the corresponding socket 42 or 44. Each cylinder 68, 70 is laterally offset from the longitudinal axis of its corresponding limb 60 or 62 such that cylinders 68, 70 are stacked on top of each other with the floors 52 of sockets 42, 44 back-to-back.

A pivot bolt 72 passes through floors 52 to join cylinders 68, 70 together and allow limbs 60, 62 to pivot toward and away from one another about the fulcrum provided by bolt 72. A preloaded torsion spring 74 is housed within a chamber defined by a pair of superimposed, sector-shaped recesses 76 (see FIGS. 12 and 13) in the backsides of floors 52 and wraps around a cylindrical, apertured peg 77 that receives bolt 72. Torsion spring 74 has a pair of opposite pigtail ends 78 and 80 that project through a slot 82 (FIGS. 2, 5 and 10) formed by the superimposed recesses 76 and into operating engagement with the facing interior sides of handles 64, 66 to yieldably bias handles 64, 66 apart, and thus jaws 54, 56 together. Consequently, jaws 54, 56 are normally spring-biased into engagement with one another and are only opened or separated when sufficient squeezing force is applied to handles 64, 66 to move handles 64, 66 toward one another.

The tapering nose 58 of clamp 16 normally points away from post 26 and toward the tail end of base 12 when clamp 16 is installed on post 26 and the fillet board 10 is in use. Preferably, clamp 16 is designed such that it cannot accidentally slip off post 26 at this time. Accordingly, locking lugs 46, 48 are obliquely disposed relative to the longitudinal axis of the clamp. Preferably, lugs 46, 48 are disposed to match up with notches 34, 36 in post 26 when the nose 58 of clamp 16 points to an approximate five o'clock position, as board 10 is viewed in top plan. Thus, clamp 16 is removable from and installable on post 26 only when the nose 58 of clamp 16 points to the five o'clock position; at all other times after installation, lugs 46, 48 are disposed underneath and blocked by rim 32 of post 26, and clamp 16 can be rotated back and forth on post 26 as may be necessary to facilitate use without accidently slipping off post 26. Recess 30 in head 28 of post 26 provides clearance for either the nut or head of pivot bolt 72, depending upon which side of clamp 16 is facing downwardly.

Clamp 16 may be constructed from a wide variety of materials without departing from the principles of the present invention. In one preferred embodiment of the invention, the limbs 60, 62 of clamp 16 are injection molded from a synthetic resinous material to facilitate mass production.

Figure 14:
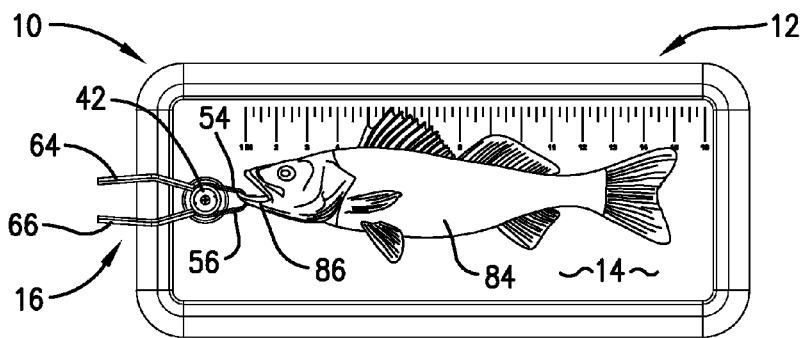
FIGS. 14-19 are schematic illustrations of one exemplary filleting technique that may be used in connection with the fillet board of the present invention.

FIGS. 14-19 illustrate one exemplary way in which board 10 may be used to hold and support a fish during filleting (in this illustration the board is oriented for right-hand use). With clamp 16 locked in place on post 26, the fish 84 may be attached to clamp 16 by laying the fish flatly on its side on work surface 14 with the head of the fish adjacent clamp 16. By then squeezing handles 64, 66 to open jaws 54, 56, the fish is moved toward clamp 16 with its mouth open until the lower lip 86 of the fish is received between the separated jaws 54, 56. Releasing the squeeze pressure on handles 64, 66 then allows the two jaws 54, 56 to clamp down tightly on lower lip 86 to partially paralyze and stabilize the fish as illustrated in FIG. 14.

Figure 15:
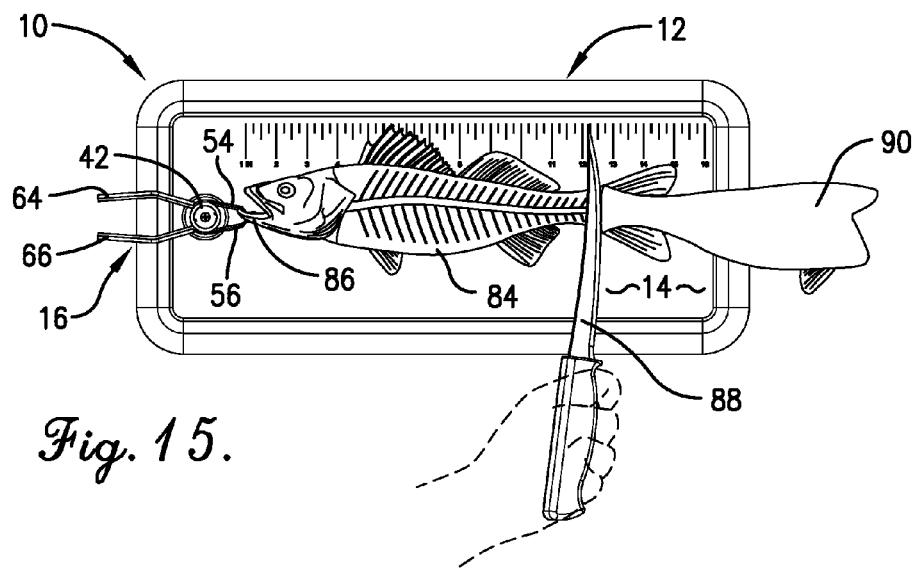

After making a transverse entry cut across the fish from top to bottom immediately behind the fish's gill flap but only deep enough to engage the backbone of the fish, the fisherman may turn the knife 88 into a horizontal position and run the blade of the knife flatly against the backbone along the full length of the fish, terminating just prior to reaching the fish's tail as illustrated in FIG. 15 to produce a fillet 90 that has been flipped to a laid open position beyond the fish's tail. The significant force required to cut through the meat and rib bones of the fish during this initial filleting stroke is fully resisted by clamp 16 as its jaws 54, 56 tightly grip the lower lip of the fish and hold the fish stable, leaving the fisherman's left hand free to perform any other duties that may be necessary or desirable.

Figure 16:
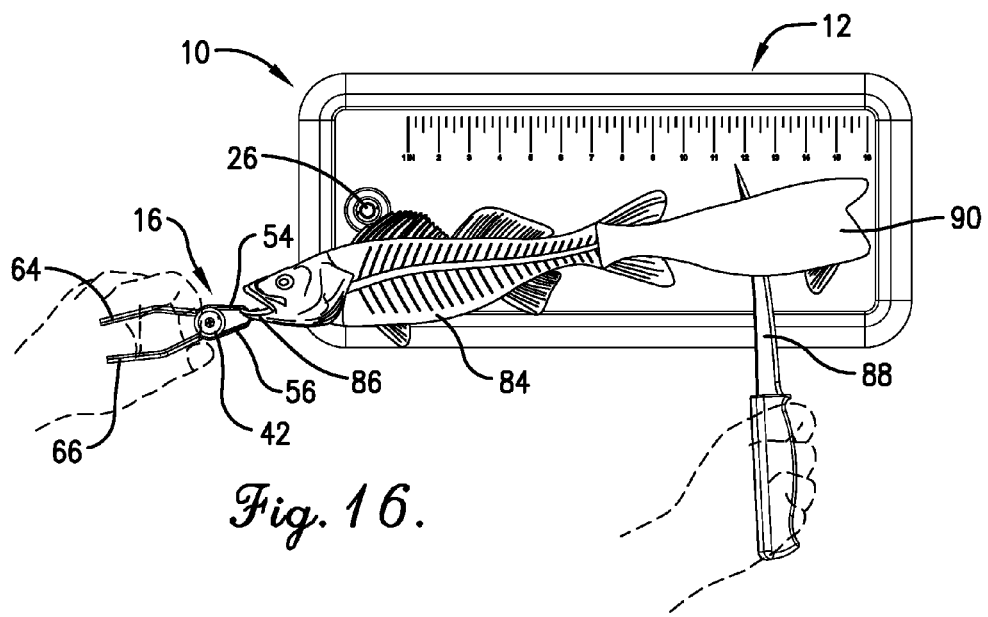

The fillet 90 in FIG. 15 still has the skin attached, so as shown in FIG. 16 the knife 88 may then be run along the length of the laid out fillet between the skin and the meat to separate the meat from the skin, which remains attached to the carcass of the fish. During this skinning stroke, the fisherman may choose to remove clamp 16 from base 12 and hold it in his left hand as illustrated in FIG. 16 while the fish remains attached to clamp 16 so that the fillet is supported by base 12, or he may simply keep clamp 16 installed on base 12 and allow the fillet to overlap the tail end of the base 12 as illustrated in FIG. 15 (if the base 12 is not long enough to support the laid out fillet). In either case, the clamp 16 continues to securely grip the fish by its lower lip and keep it under complete control.

It will be appreciated that the base of the fillet board may be made available in any desired length. In some instances, having an extra long base that is on the order of twice as long as the fish being filleted is helpful during the skin removal step to provide underlying support for the fillet being skinned. One way of providing such extra length is to make the base foldable in the middle so that, if additional length is needed, the extension is simply unfolded from the main portion until the work surface of the extension section is flush with the work surface of the main section. When not needed, the extension is simply folded under the main section and maintained out of the way.

Figure 17:
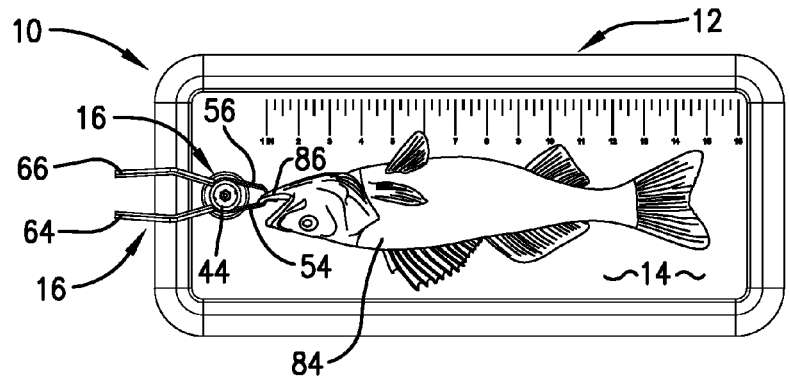

Once the first fillet has been prepared and laid aside, the fisherman removes clamp 16 with its attached fish from post 26 (if they have not already been removed during the skinning step) and flips both the clamp and attached fish over 180° to position the opposite side of the fish facing upwardly for filleting as shown in FIG. 17. The clamp 16 is reinstalled on post 26 using whichever socket 42, 44 is now facing downwardly, and the fish is ready for removal of the second fillet. Note that there is no need to release the fish from clamp 16 prior to flipping it over. In fact, doing so would only waste time and provide an opportunity for the fish to experience a reflex action and fling slime and viscera throughout the area or flip completely off fillet board 10.

Figure 18:
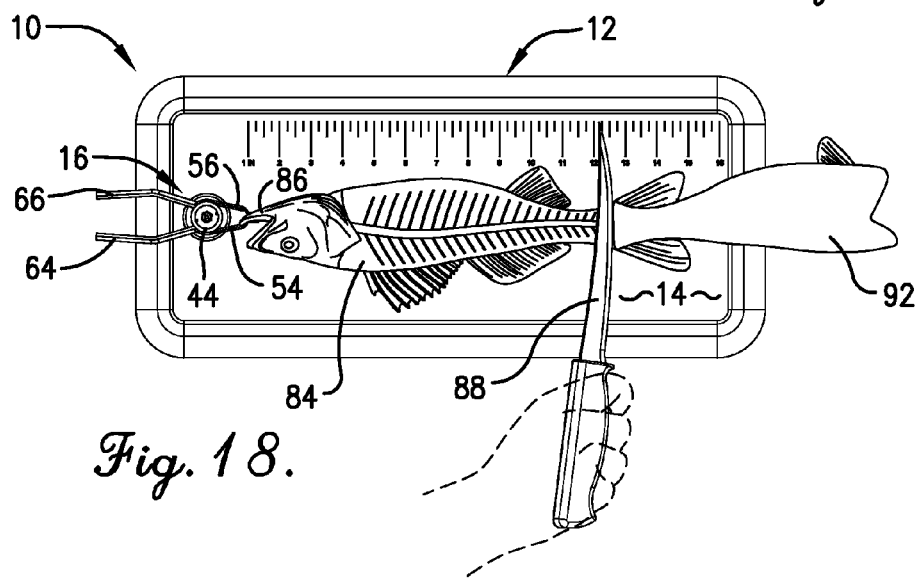
Figure 19:
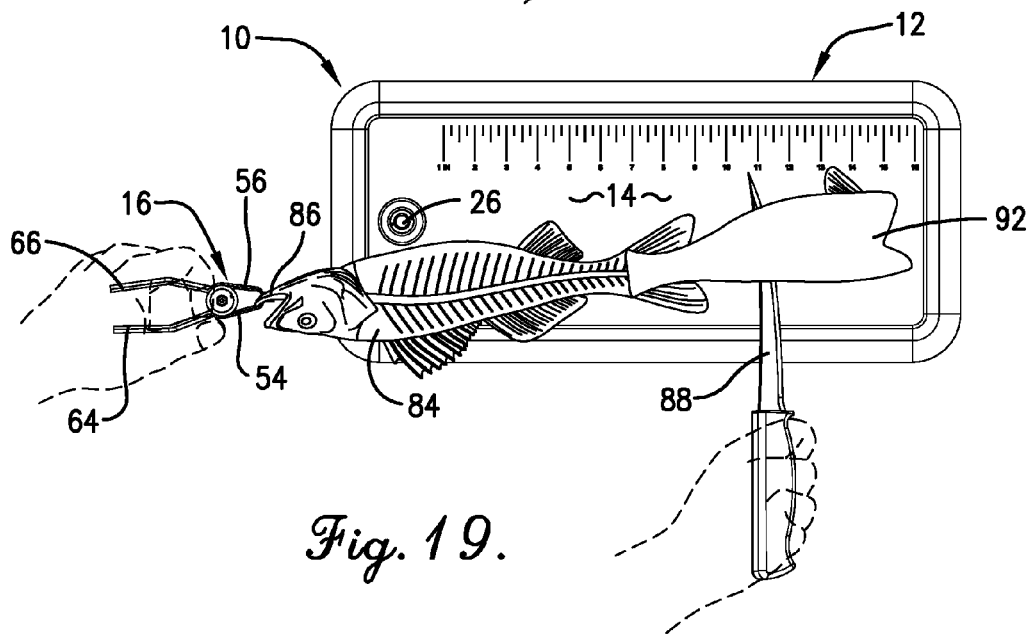
Figure 21:
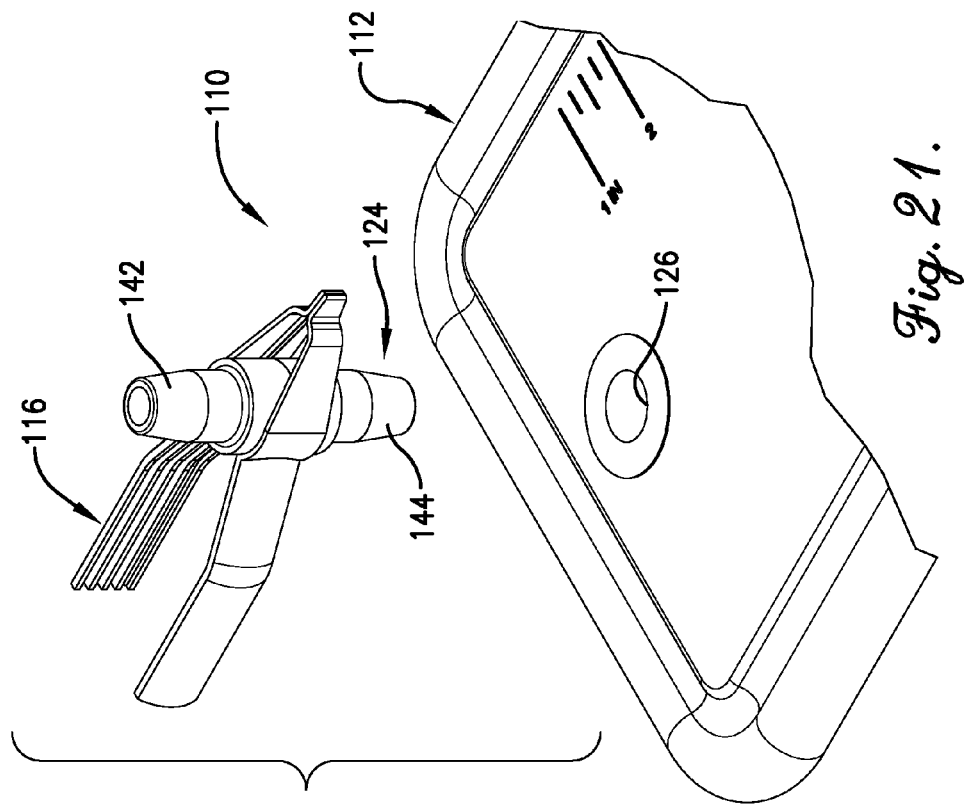
FIG. 21 is a fragmentary top perspective view of the fillet board of FIG. 20 with the clamp detached from the base.
Figure 20:
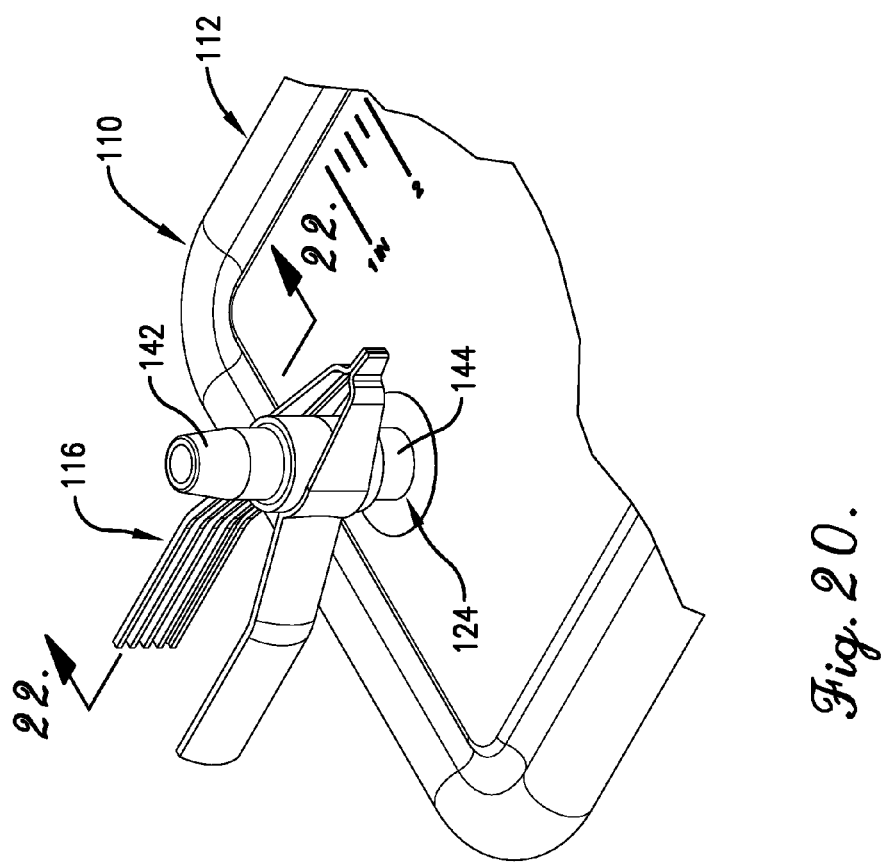
FIG. 20 is a fragmentary top perspective view of a second embodiment of fillet board constructed in accordance with the principles of the present invention with the clamp installed on the base.
Figure 22:
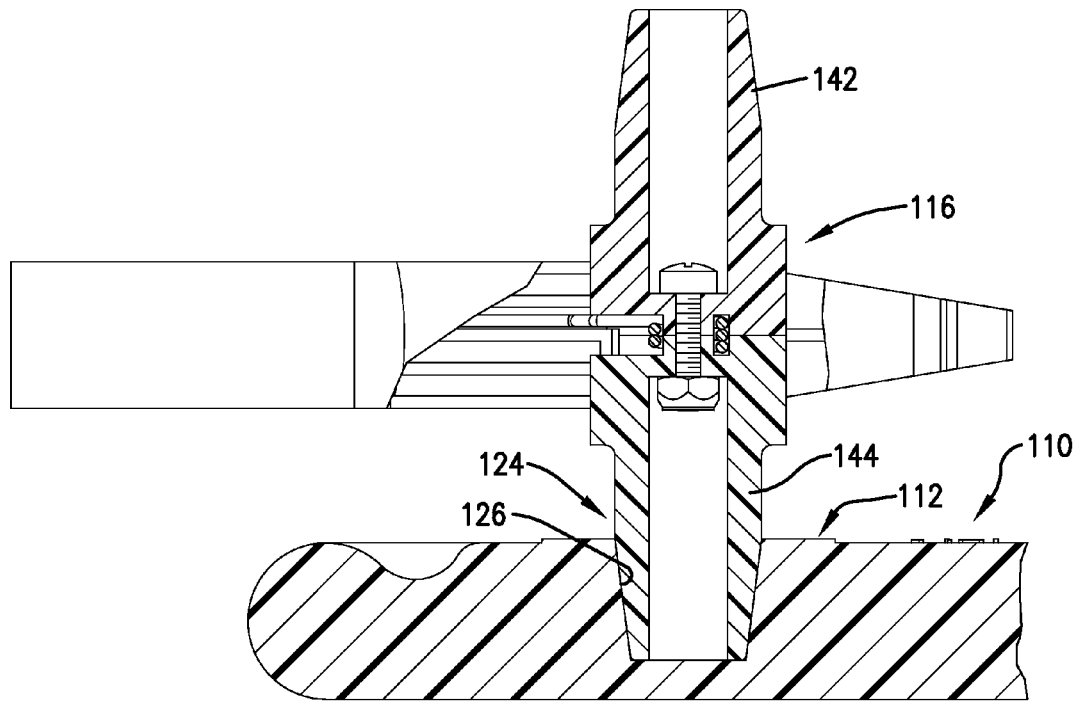
FIG. 22 is a slightly enlarged, fragmentary cross-sectional view of the fillet board of FIG. 20 taken substantially along line 22-22 of FIG. 20.
Figure 23:
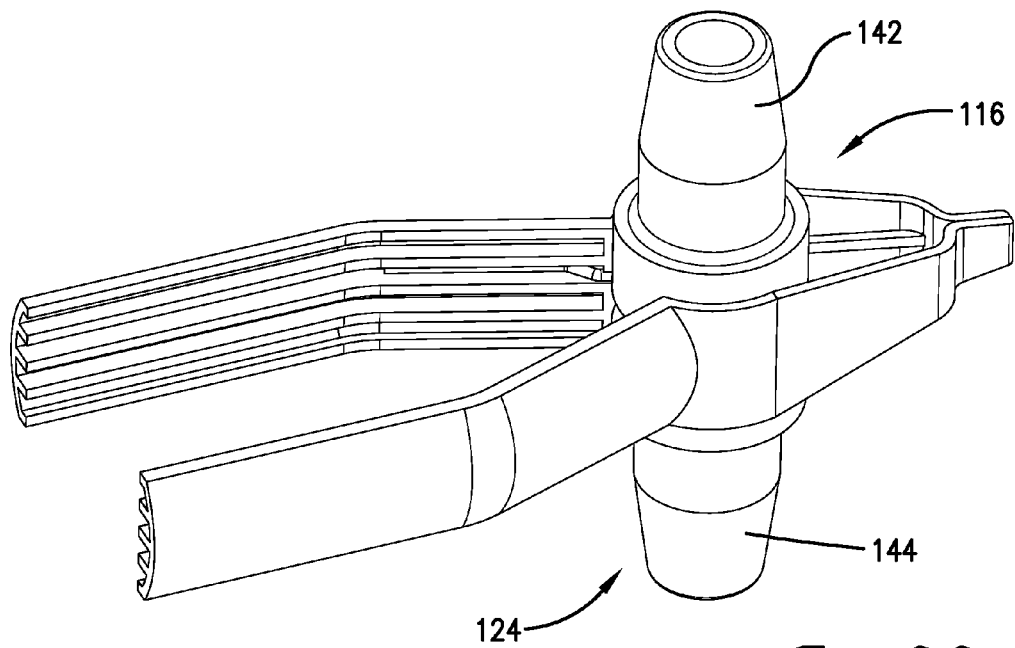
FIG. 23 is a slightly enlarged, top rear perspective view of the clamp for the fillet board of FIG. 20.
Figure 24:
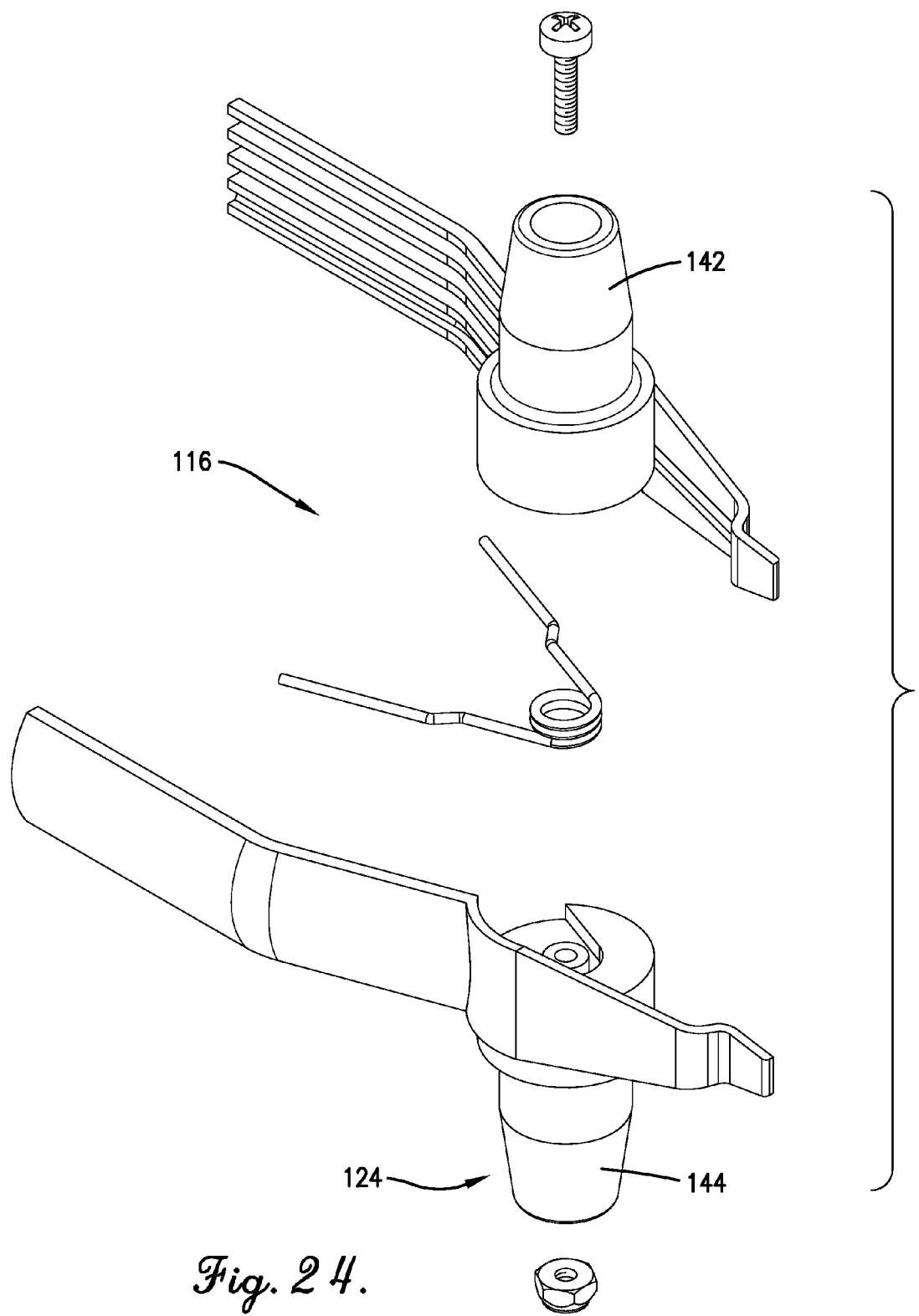
FIG. 24 is a slightly enlarged, exploded, top front perspective view of the clamp for the fillet board of FIG. 20.

With the fish now positioned as shown in FIG. 17, the fisherman makes a transverse cut immediately behind the gill flap and down to the backbone before then turning the knife flat and running it along the backbone toward the tail to produce a second fillet 92 as illustrated in FIG. 18. Clamp 16 securely holds the fish against base 12 during this procedure and, once again, leaves the fisherman's left hand free to carry out any other duties that may be necessary or desirable at this time. Finally, the fisherman removes the second fillet from the skin of the fish as illustrated in FIG. 19 in the same manner as the first fillet. Once both fillets have been removed from the fish, the carcass may be carried by clamp 16 to the disposal site and simply released at that location by opening the jaws of the clamp. The rib bones in the skinned fillets may then be removed in the usual manner without using clamp 16.

It will thus be seen that a fillet board in accordance with the present invention provides a significant advance in the art. By having the line of action "A" of the clamping jaws in a horizontal plane parallel to work surface 14 of base 12 instead of in a vertical plane perpendicular to work surface 14, the fish may be firmly gripped by its lower lip and rendered partially paralyzed throughout the fisherman's filleting efforts. Moreover, using clamp 16 rather than the fisherman's hand to hold the fish means that the fisherman always has one hand free to perform any other actions or duties that may be necessary or desirable throughout the filleting process. In effect, clamp 16 of board 10 thus serves as a "third hand" for the fisherman. And by making clamp 16 so it can be quickly and easily detached, turned over, and reattached to post 26, the fish can remain gripped by its lower lip by clamp 16 and properly controlled at all times in the filleting process, even during the transition from one side to the other when the fish is flipped over.

ALTERNATIVE EMBODIMENT

FIGS. 20-24 illustrate another embodiment of the invention. In this embodiment the fillet board 110 utilizes a modified quick attach structure 124 wherein the male and female parts on the base 112 and clamp 116 are reversed from their arrangement in the embodiment of FIGS. 1-19. In this respect, instead of a post 26, base 112 is provided with a blind hole 126 extending part way through base 112. Instead of sockets 42 and 44, clamp 116 is provided with a pair of oppositely projecting, generally cylindrical posts 142 and 144 that are interchangeably and removably receivable within hole 126. Instead of using locking lugs and notches, each post 142, 144 may be slightly tapered such that the outer end thereof has a slightly smaller diameter than hole 126 while the inner end thereof has a slightly larger diameter than hole 126. Thus, each post 142, 144 may be lightly wedged within hole 126 for retention purposes during use. In all other aspects, base 112 and clamp 116 are substantially the same in construction and operation as base 12 and clamp 16.

The inventors hereby state their intent to rely on the Doctrine of Equivalents to determine and assess the reasonably fair scope of their invention as pertains to any apparatus or method not materially departing from but outside the literal scope of the invention as set out in the following claims.

The invention claimed is:

1. A fish fillet board comprising:
a base having a work surface for supporting the body of a fish on its side during filleting of the fish; and
a clamp on the base having a pair of opposed clamping jaws for releasably securing the fish to the base during filleting of the fish,
at least one of said jaws being movable relatively toward and away from the other jaw along a path of travel that extends generally parallel to said work surface of the base to permit the jaws to grip and hold the fish by its lower lip during filleting,
said clamp and said base being provided with quick attach mounting structure permitting the clamp to be removed from said base and remounted thereon in an inverted position for turning over the fish without releasing the jaws of the clamp from the lower lip of the fish,
said quick attach mounting structure comprising a mounting post on the board and a pair of mounting sockets on opposite upper and lower sides of the clamp for selectively receiving said post depending upon which side of the clamp is facing the base.

2. A fish fillet board as claimed in claim 1,
said post and said sockets having releasably interengageable components for retaining the clamp on the post.

3. A fish fillet board as claimed in claim 1,
said jaws of the clamp being yieldably-biased toward one another.

4. A fish fillet board as claimed in claim 1,
both of said jaws being movable.

5. A fish fillet board as claimed in claim 1,
said at least one jaw of the clamp being mounted for pivoting movement along said path of travel about an axis that extends generally normal to said work surface of the base.

6. A fish fillet board as claimed in claim 5,
both of said jaws of the clamp being mounted for pivoting movement along said path of travel about an axis that extends generally normal to said work surface of the base.

7. A fish fillet board comprising:
a base having a work surface for supporting the body of a fish on its side during filleting of the fish; and
a clamp on the base having a pair of opposed clamping jaws for releasably securing the fish to the base during filleting of the fish,
at least one of said jaws being movable relatively toward and away from the other jaw along a path of travel that extends generally parallel to said work surface of the base to permit the jaws to grip and hold the fish by its lower lip during filleting,
said clamp and said base being provided with quick attach mounting structure permitting the clamp to be removed from said base and remounted thereon in an inverted position for turning over the fish without releasing the jaws of the clamp from the lower lip of the fish,
said quick attach mounting structure comprising a pair of posts projecting in opposite directions from opposite upper and lower sides of the clamp and a mounting socket on said base for receiving a selected one of said posts depending upon which side of the clamp is facing the base.

8. A fish fillet board as claimed in claim 7,
said socket and said posts being tapered relative to one another to permit the posts to be releasably wedged within the socket.

9. A fish fillet board as claimed in claim 7,
said jaws of the clamp being yieldably-biased toward one another.

10. A method for use in filleting a fish comprising:
providing a fillet board having a base and a clamp attached to the base in such a manner that at least one jaw of a pair of opposed jaws of the clamp is movable relatively toward and away from the other jaw in a horizontal plane generally parallel to an upwardly facing work surface of the base;
securing the fish to the board by clamping a lower lip of the fish between the jaws of the clamp so that the fish lies on its side against the work surface of the base; and
making cuts on the fish while the lower lip of the fish is clamped between the jaws of the clamp.

11. A method for use in filleting a fish as claimed in claim 10, wherein said step of making cuts on the fish includes cutting a fillet from one side of the fish in such a manner that the fillet remains attached to the fish by skin near the tail of the fish, and then separating the fillet from the skin without cutting the skin from the remaining carcass of the fish.

12. A method for use in filleting a fish as claimed in claim 11, wherein the clamp is detached from the base and held manually during separation of the fillet from the skin.

13. A method for use in filleting a fish as claimed in claim 10, wherein after cuts are made on one side of the fish the clamp is detached from the base, the clamp and fish are inverted without releasing the clamp from the lower lip of the fish, the inverted clamp is reattached to the base, and cuts are made on the opposite side of the fish while the lower lip of the fish remains clamped between the jaws of the clamp.

14. A method for use in filleting a fish as claimed in claim 10, wherein said step of making cuts on the fish includes cutting a first fillet from one side of the fish in such a manner that the first fillet remains attached to the one side of the fish by skin near the tail of the fish, then separating the first fillet from the skin on the one side of the fish without cutting the skin from the remaining carcass of the fish before the clamp and the fish are inverted, then inverting the clamp and the fish without releasing the clamp from the lower lip of the fish, then cutting a second fillet from the opposite side of the fish in such a manner that the second fillet remains attached to the opposite side of the fish by skin near the tail of the fish, then separating the second fillet from the skin on the opposite side of the fish without cutting the skin from the remaining carcass of the fish.

15. A method for use in filleting a fish as claimed in claim 14, wherein the clamp is detached from the base and held manually during separation of each fillet from the skin.

* * * * *